April 16, 1963    P. R. DEUSS    3,085,786
FLOORBOARD LIFTERS AND THE LIKE
Filed Jan. 6, 1961    2 Sheets-Sheet 1

April 16, 1963  P. R. DEUSS  3,085,786
FLOORBOARD LIFTERS AND THE LIKE
Filed Jan. 6, 1961  2 Sheets-Sheet 2

Inventor:
Peter Raymond Deuss
by:
Alexander & Dowell

United States Patent Office 3,085,786
Patented Apr. 16, 1963

3,085,786
FLOORBOARD LIFTERS AND THE LIKE
Peter Raymond Deuss, 14 Christopher Ave., Hanwell,
London W. 7, England
Filed Jan. 6, 1961, Ser. No. 81,050
Claims priority, application Great Britain Jan. 15, 1960
4 Claims. (Cl. 254—100)

The present invention relates to a device for raising floorboarding, planking, and the like, which are usually nailed in position to supporting joists. Such boarding has to be raised periodically in order to connect or modify the gas, water, or electrical services laid beneath said boarding, or to inspect for dry rot or woodworm. It is a general object of the invention to provide an improved construction for such lifters, the advantages of which will hereinafter appear.

A specific object of the invention is to provide a lifter for raising floorboarding which imparts a direct and even pull, and thus improves on the present method of levering up from the sides or one end with a bolster or other suitable implement. This levering often causes the board to split or splinter, bruises and indentations being left on both the board being raised and the adjoining boards by said levering action. This unsightly appearance is particularly noticeable when the boarding is not later covered with linoleum or carpet.

A further object is to reduce the physical effort involved in raising boarding, and to provide a lifter which is extremely portable and light in weight.

According to the invention there is provided a device for raising floorboarding and the like, comprising a bridge device, side portions attached to the bridge device, said side portions being spaced apart to straddle the board to be lifted, a screw-threaded bar passing vertically and freely through the bridge device, a flat plate attachment member rotatably mounted on the lower end of the screw-threaded bar and having apertures therein for the reception of screws for attachment to the board and a nut member mounted on the screw-threaded bar above said bridge member whereby rotation of the screw-threaded bar, with the nut member engaging the bridge device, raises the screw-threaded bar and the plate member.

Figure 1:
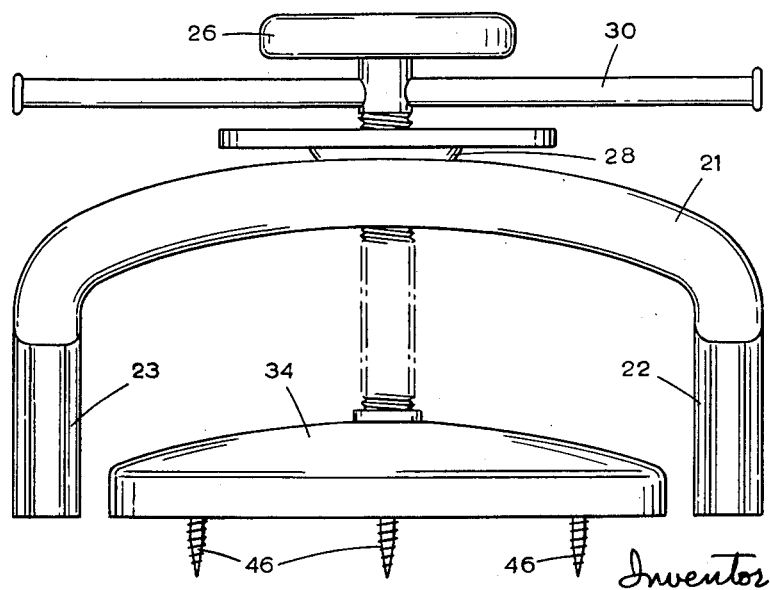
Figure 2:
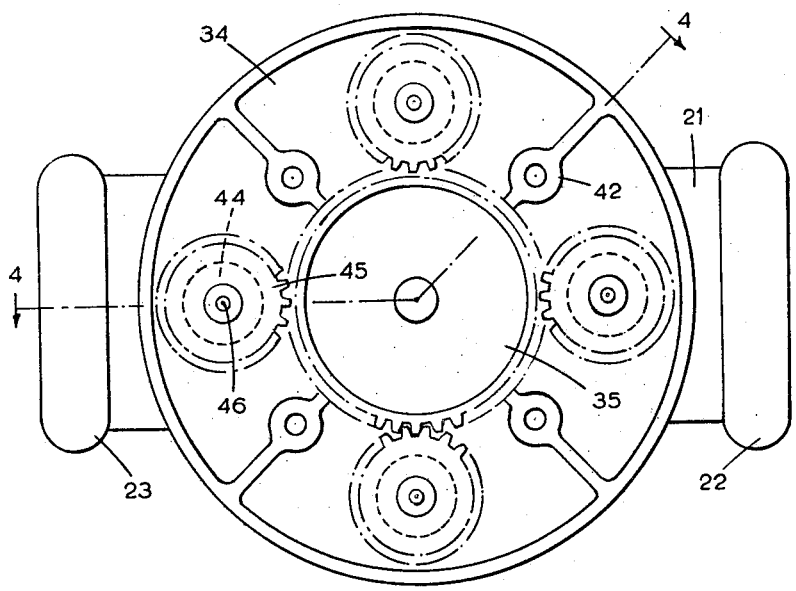
Figure 3:
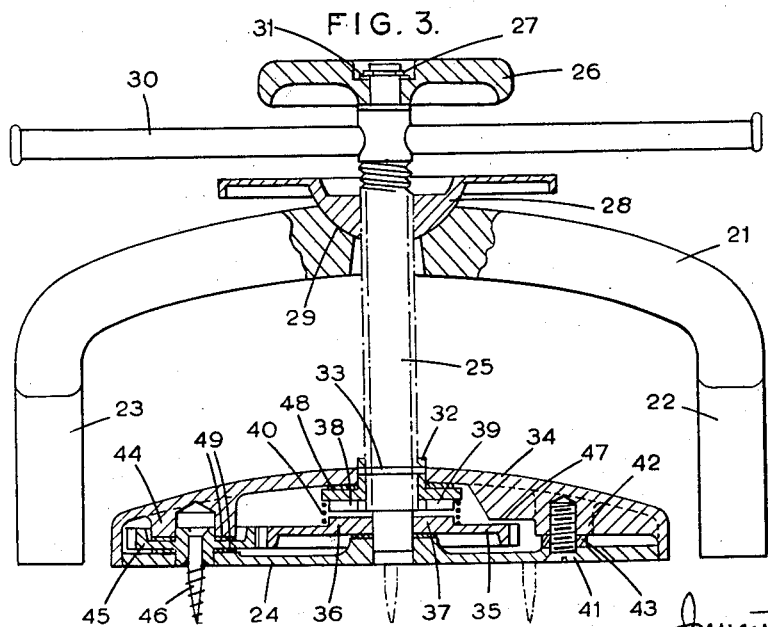

Constructional forms of the invention will now be described, by way of example, with reference to the accompanying drawings, in which, FIGURE 1 shows a side elevation of the invention,
FIGURE 2 shows an underside plan view of the invention with its base plate removed, and,
FIGURE 3 shows a sectional side elevation along the line 4—4 in FIGURE 2 with its base plate attached.

Referring now to FIGURES 1, 2 and 3 a floorboard lifting device is shown comprising a substantially inverted U-shape bridge member having a transverse portion 21 and two parallel side portions 22 and 23. The side portions 22, 23 are spaced apart to straddle the floorboard or plank to be lifted. A screw-threaded bar 25 is supported in a threaded bore in a hemi-spherical nut member 28 which seats in a recess 29 of the transverse portion 21.

A knob 26 is mounted on a reduced diameter portion of the bar 25 at its upper end. The knob 26 is retained by a spring circlip 27 and a washer 31. Immediately below the knob 26 a tommy bar 30 is located in a through hole in the bar 25.

The bar 25 is left hand threaded over the majority of its length and at its lower end a drive member 32 is screwed on and secured against rotation by a pin 33.

The drive member 32 is rotatably mounted in a housing 34 and the extreme end of the bar 25 is rotatably mounted in a hole in a flat plate attachment member or base plate 24.

A gearwheel 35 is free to rotate on the bar 25 and is drivably connectable to the drive member 32 by means of a clutch formed by two projections 36 and 37 which may be engaged in two diametrically aligned grooves 38 and 39 formed in a disc shaped lower portion of the drive member 32. The drive member 32 and the gearwheel 35 are urged apart, out of drivable engagement, by a spring 40 arranged between them. Arranged between the disc shaped lower portion of the drive member 32 and the housing 34 is a thrust washer 48.

The attachment member or base plate 24 is attached to the housing 34 by means of four screws 41 which are countersunk in the base plate 24 and are screwed into four bosses 42 formed in the housing 34. Surrounding each screw 41 and arranged between the base plate 24 and each boss 42 is a spacing washer 43.

Between the bosses 42 four further bosses 44 are formed in the housing 34, each of which is bored to receive one end of the hub of a pinion 45. The other end of each hub of the pinion 45 is mounted in a coaxial hole in the base plate 24 and each pinion 45 carries a coaxially mounted self-tapping screw 46 which passes through a bore in the hub of the pinion 45 and is soft-soldered into position. The four self-tapping screws 46 project through the base plate 24.

The four pinions 45 are arranged on a common pitch circle diameter the centre of which coincides with the axis of the screw member 25 and the gearwheel 35. Each of the pinions 45 is in constant mesh with the gearwheel 35.

Thrust washers 49 are interposed between the pinions 45 and the bosses 44, and between the pinions 45 and the base-plate 24. Each of the bosses 42 is radially webbed for additional strength and a part 47 of each web is used to provide axial location of the gearwheel 35, which is also located by the base plate 24.

The floorboard lifter is used by positioning the side portions 22, 23 of the bridge member astride the floorboard to be lifted and screwing the insert 28 to the top of the bar 25. The knob 26 is pressed down against the force of the spring 40 and bar 25 is slightly rotated to engage the drive member 32 with the gearwheel 35 using the tommy bar 30.

When the gearwheel 35 has been engaged the tommy bar 30 is further rotated in an anti-clockwise direction thus rotating the screws 46 in a clock-wise direction. The screws 46 are thus driven into the floorboard to be lifted.

With the screws 46 driven fully home the knob 26 is released, thus disengaging the bar 25 from the gearwheel 35; the insert 28 is screwed down the bar 25 to seat in the recess 29 and the tommy bar 30 is rotated in a clockwise direction. The board is then raised in an even manner.

The provision of the semi-cylindrical or hemispherical insert in the embodiment described allows the attachment member and screw-threaded bar assemblies to pivot with the gradual increase in inclination of the floorboard as it is being raised.

Both the bridge member and the attachment member assembly may be of die cast aluminum alloy for lightness in weight, sufficient strength being incorporated in design by webbing in places of maximum stress.

I claim:
1. A device for raising floorboarding and the like, comprising a bridge device, side portions attached to the bridge device, said side portions being spaced apart to straddle the board to be lifted, a screw-threaded bar passing vertically and freely through the bridge device, a plate attachment member rotatably mounted on the lower end of the screw-threaded bar and having apertures therein, a plurality of screws projecting downwardly through said apertures for attachment to the board, a first drive mem- ber mounted on the lower end of the bar, a second drive member supported by the plate attachment member and selectively engageable with and disengageable from the first drive member and drivably engaged with the screws to screw the latter into the board on being rotated in a predetermined direction, and a nut member threadedly mounted on the bar above the bridge member, whereby rotation of the bar in a first direction with the second drive member in engagement with the first drive member causes the said first drive member to rotate in the said predetermined direction to screw the screws into the board to be lifted, the threads on the bar and the nut being of a direction such that rotation of the bar in a direction relative to the nut member opposite to the first direction with the nut member engaging the bridge device raises the screw-threaded bar in relation to the bridge device.

2. A device for raising floorboarding and the like, comprising a bridge device, side portions attached to the bridge device, said side portions being spaced apart to straddle the board to be lifted, a screw-threaded bar passing vertically and freely through the bridge device, a plate attachment member rotatably mounted on the lower end of the screw-threaded bar and having apertures therein, a plurality of pinions rotatably supported by the plate attachment member one at each aperture, a plurality of screws coaxially attached one to each pinion and projecting downwardly through said apertures for attachment to the board, a first drive member mounted on the lower end of the bar, a second drive member supported by the plate attachment member and selectively engageable with and disengageable from the first drive member, a gearwheel supported by the plate attachment member, permanently coupled to the said second drive member and meshing with the pinions attached to the screws to screw the latter into the board on being rotated in a predetermined direction, and a nut member threadedly mounted on the bar above the bridge member, whereby rotation of the bar in a first direction with the second drive member in engagement with the first drive member causes the said gearwheel to rotate in the said predetermined direction to screw the screws into the board to be lifted, the threads on the bar and the nut being of a direction such that rotation of the bar in the direction relative to the nut member opposite to the first direction with the nut member engaging the bridge device raises the screw-threaded bar in relation to the bridge device.

3. A device for raising floorboarding and the like, comprising a bridge device, side portions attached to the bridge device, said side portions being spaced apart to straddle the board to be lifted, a screw-threaded bar passing vertically and freely through the bridge device, a plate attachment member rotatably mounted on the lower end of the screw-threaded bar and having apertures therein equidistantly spaced from the axis of the bar, a plurality of pinions rotatably supported by the plate attachment member one at each aperture, a plurality of screws coaxially attached one to each pinion and projecting downwardly through said aperture for attachment to the board, a first dog-clutch drive member mounted on the lower end of the bar, a second dog-clutch drive member supported by the plate attachment member and selectively engageable with and disengageable from the first dog-clutch drive member, a gear-wheel supported by the plate attachment member, fixed to the said second dog-clutch drive member coaxially therewith and meshing with the pinions attached to the screws to screw the latter into the board on being rotated in a predetermined direction, and a nut member threadedly mounted on the bar above the bridge member, whereby rotation of the bar in a first direction with the second drive member in engagement with the first drive member causes the said gearwheel to rotate in the said predetermined direction to screw the screws into the board to be lifted, the threads on the bar and the nut being of a direction such that rotation of the bar in the direction relative to the nut member opposite to the first direction with the nut member engaging the bridge device raises the screw-threaded bar in relation to the bridge device.

4. A device for raising floorboarding and the like, comprising a bridge device, side portions attached to the bridge device, said side portions being spaced apart to straddle the board to be lifted, a screw-threaded bar passing vertically and freely through the bridge device, a plate attachment member rotatably mounted on the lower end of the screw-threaded bar and having apertures therein equidistantly spaced from the axis of the bar, a plurality of pinions rotatably supported by the plate attachment member one at each aperture, a plurality of screws coaxially attached one to each pinion and projecting downwardly through said apertures for attachment to the board, a first dog-clutch drive member mounted on the lower end of the bar, a second dog-clutch drive member supported by the plate attachment member and selectively engageable with and disengageable from the first dog-clutch drive member, a spring member disposed between the said first and second dog-clutch drive members and urging them apart, a gearwheel supported by the plate attachment member, fixed to the said second dog-clutch drive member coaxially therewith and meshing with the pinions attached to the screws to screw the latter into the board on being rotated in a predetermined direction, and a nut member threadedly mounted on the bar above the bridge member, whereby rotation of the bar in a first direction with the second drive member in engagement with the first drive member causes the said gearwheel to rotate in the said predetermined direction to screw the screws into the board to be lifted, the threads on the bar and the nut being of a direction such that rotation of the bar in the direction relative to the nut member opposite to the first direction with the nut member engaging the bridge device raises the screw-threaded bar in relation to the bridge device.

References Cited in the file of this patent

UNITED STATES PATENTS

| | | |
|---|---|---|
| 105,534 | Windsor | July 19, 1870 |
| 131,724 | Varin | Sept. 24, 1872 |
| 175,264 | Welch | Mar. 28, 1876 |
| 215,357 | Henderer | May 13, 1879 |
| 314,619 | Stambaugh | Mar. 31, 1885 |
| 367,243 | Sellers | July 26, 1887 |
| 429,761 | Hoag | June 10, 1890 |
| 1,736,506 | Munson et al. | Nov. 19, 1929 |
| 2,820,285 | Neumeister | Jan. 21, 1958 |